United States Patent [19]

Fischer, Jr. et al.

[11] Patent Number: 5,084,546

[45] Date of Patent: Jan. 28, 1992

[54] FIRE RETARDANT EPOXY RESIN COMPOSITIONS CONTAINING METHYLOL SUBSTITUTED PHOSPHINE OXIDES

[75] Inventors: Robert G. Fischer, Jr., Fairfield; Chester J. Calbick, Weston, both of Conn.

[73] Assignee: American Cyanamid Company, Stamford, Conn.

[21] Appl. No.: 626,508

[22] Filed: Dec. 12, 1990

[51] Int. Cl.$^5$ .................. C08G 59/30; C08G 59/62
[52] U.S. Cl. ........................ 528/108; 528/93; 528/102; 528/103; 528/365; 528/398
[58] Field of Search ............... 528/102, 108, 398

[56] References Cited

U.S. PATENT DOCUMENTS 2,916,473  12/1959  Bullock et al. .............. 528/108
3,666,543   5/1972  Maier ........................ 428/921
4,345,059   8/1982  Fretz, Jr. et al. ........... 528/108

Primary Examiner—Harold D. Anderson
Assistant Examiner—Frederick Krass
Attorney, Agent, or Firm—Frank M. Van Riet

[57] ABSTRACT

Thermosetting epoxy resin compositions having improved flame retardancy having combined therewith an effective amount of a dihydroxymethyl phosphine oxide having the general formula

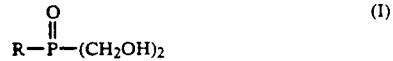

wherein R represents an alkyl group having from 1 to about 8 carbon atoms or —R'OH where R' represents an alkylene group having from 2 to about 8 carbon atoms, are disclosed.

15 Claims, No Drawings

FIRE RETARDANT EPOXY RESIN COMPOSITIONS CONTAINING METHYLOL SUBSTITUTED PHOSPHINE OXIDES

STATEMENT OF THE INVENTION

The present invention relates to thermosetting epoxy resin compositions which are rendered flame retardant by having combined therewith an effective amount of specific dihydroxymethyl phosphine oxides.

BACKGROUND OF THE INVENTION

Epoxy resins and their utility are well known and have been described in numerous publications. Just as well known is the propensity of these resins to burn. To improve their flame retardant characteristics, epoxy resins have been compounded with phosphate and phosphonate esters including those containing haloalkyl groups as described in British Patent No. 1,487,609; U.S. Pat. No. 3,192,242 and South African Patent No. 18201/77. The use of triphenylphosphine as a flame retardant additive for epoxy resins was described by Martin and Price, J. Applied Polymer Science, 12, 143–158 (1968).

Tetrakishydroxymethylphosphonium chloride and trishydroxymethylphosphine oxide have also been used in epoxy resins as described in U.S. Pat. No. 2,916,473. Aminoalkylphosphonic acid esters are suggested as fire retardant hardeners for epoxy resins in U.S. Pat. No. 4,151,229.

U.S. Pat. Nos. 3,666,543 and 3,716,580 disclose 2-hydroxyalkylphosphine oxides and halogenated derivatives thereof that are said to have utility as flame proofing agents.

U.S. Pat. Nos. 4,345,059; 4,380,571 and 4,440,944 all disclose fire retardant epoxy resin compositions which contain 3-hydroxyalkylphosphine oxides to impart said fire retardant characteristics.

Addition of halogenated organic compounds alone to epoxy resins for imparting flame retardancy is well known and widely practiced. The most widely used method is to add a brominated bis-phenol acetone or a bis-epoxide adduct thereof to the resin. However, these brominated resins, when used alone, require bromine contents of up to 20% or even higher to be effective. These large organobromine levels increase the density of the resin, generate large amounts of smoke containing corrosive materials such as hydrogen bromide gas, and may lead to generation of highly toxic materials such as polybrominated dibenzodioxins. Formulations which reduce the bromine content required for flame retardancy would thus have significant value.

However, phosphorus based known flame retardant additives for use in epoxy resin compositions generally suffer from one or more deficiencies including low compatibility with the resin, low thermal stability or poor fire retardant behavior. Some fire retardant additives also negatively impact the glass transition temperature of the resin to an unacceptable extent.

SUMMARY OF THE INVENTION

The present invention is directed to thermosetting epoxy resin compositions having improved flame retardancy having combined therewith an effective amount of a dihydroxymethyl phosphine oxide having the general formula

wherein R represents an alkyl group having from 1 to about 8 carbon atoms or —R'OH where R' represents an alkylene group having from 2 to about 8 carbon atoms.

The present invention is also directed to a method of rendering epoxy resins fire retardant through the incorporation of the dihydroxyalkyl phosphine oxides of Formula I therein.

In a further embodiment, the present invention is directed to epoxy laminate compositions containing the dihydroxyalkyl phosphine oxide of Formula I.

DETAILED DESCRIPTION OF THE INVENTION

In accordance with the present invention, it has been discovered that the addition of a relatively small but effective amount of a dihydroxyalkyl phosphine oxide having a structure as set forth in Formula I to an epoxy resin will substantially increase its resistance to burning. These fire retardant resins also exhibit excellent handling characteristics including glass transition temperatures (Tg's). Further, even upon burning, such resins evolve substantially reduced quantities of smoke than do many other fire retardant epoxy resin compositions.

The dihydroxyalkyl phosphine oxides of Formula I may be used with either conventional hardeners, such as amine or anhydride hardeners, and they may also be used alone or in combination with halogen-containing epoxide resins, such as bromine-containing resins. When the epoxide resin is heat cured in the presence of the dihydroxyalkyl phosphine oxide and a hardener, the dihydroxyalkyl phosphine oxide is believed to react with the hardener and/or terminal epoxy groups to become incorporated in the polymer molecule.

The dihydroxyalkyl phosphine oxides useful in the practice of the present invention are those represented by the general formula

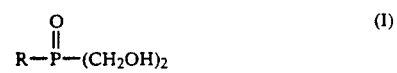

wherein R represents an alkyl group having from 1 to about 8 carbon atoms or the group —R'OH wherein R' represents an alkylene group having from 2 to about 8 carbon atoms. Preferred are compounds of Formula I wherein R represents alkyl groups having from 1 to about 4 carbon atoms and $R^1$ represents alkyl groups having 2 to about carbon atoms.

Particularly effective in increasing the fire resistance of epoxy resins, and especially preferred in the practice of the present invention are: isobutyl-bis(hydroxymethyl)phosphine oxide, t-butyl-bis(hydroxymethyl)phosphine oxide, methyl-bis(hydroxymethyl)phosphine oxide, and mixtures thereof.

The dihydroxymethyl phosphine oxides useful in the practice of the present invention may be conveniently prepared by reacting a monoalkyl phosphine with two equivalents of formaldehyde in an aqueous solution with control of the pH of said solution followed by oxidation with a stoichiometric amount of hydrogen peroxide.

Although any of the known hardeners for epoxy resins may be used in conjunction with the phosphine oxide flame retardant additives, the amine and anhydride hardeners are particularly preferred. The phosphine oxides may, if desired, be reacted with a typical cyclic dicarboxylic acid anhydride such as phthalic anhydride, nadic methyl anhydride, etc., to form an intermediate ester which will further react in an epoxy resin system to produce a cured flame retardant object. Alternatively, the phosphine oxides may be reacted with the epoxy resin monomers such as epichlorohydrin with elimination of hydrochloric acid to give a glycidyl ether derivative. Such intermediates would have excellent compatibility with epoxy resins and minimize the reaction between the hardener and the phosphine oxide.

Alternatively, the phosphine oxides may be mixed with or partially reacted with the uncured epoxy resins followed by addition of the hardener, anhydrides or amines to cure the resin.

Other suitable hardeners for the claimed epoxy resins are the aromatic amines such as methylene dianiline or other amines such as dicyandiamide or other higher temperature curing agents such as 4,4' diaminodiphenyl sulfone, or $BF_3$-monoethylamine complex.

The particular epoxy resin and the specific hardener that is used are not critical as the phosphine oxides herein described will react with all of the known epoxy resins. The hardeners employed need not be limited to those mentioned above as all hardeners common to epoxy resin technology may be used to obtain the fire retardant epoxy resins of the present invention.

It should also be understood that if the functionality of the epoxy resin and/or the phosphine oxide and/or the hardener is three or greater, crosslinking may occur with the production of infusable molded objects whereas when the functionality of the phosphine oxide, epoxy resins and anhydride or amine is two or less, thermoplastic resins are obtained.

Mixtures may be prepared of the phosphine oxides and hardeners prior to addition of the epoxy resin monomer. Such phosphine oxide-hardener intermediate may be prepared by heating the phosphine oxide with, for example, anhydrides at a temperature between 70° C. and 120° C. until a solution forms. Mixed anhydrides, such as mixtures of phthalic anhydride and nadic methyl anhydride, in all proportions may be used. The phosphine oxide may be present in amounts such that the phosphorus content of the resin is up to 5% by weight or more in the final resin formulation but is preferably present in amounts from about 0.01% to about 5% by weight based upon the weight of epoxide present. Most preferably, the phosphine oxide additives are present in amounts such that the phosphorus content of the resin ranges from 0.05 to about 2.0% by weight based upon the final resin formation. When anhydrides are used as the hardener, stoichiometric amounts are preferred, i.e. the ratio of the moles of dibasic anhydride to the equivalents of epoxide is desirably from about 0.80 to about 1.2. Optimally, the ratio of the moles of anhydride to the equivalents of epoxide is between about 0.90 and about 1.0.

In those cases where the solubility of the phosphine oxide flame retardants in the epoxy resin monomers is not a problem, the phosphine oxides can be mixed with the epoxy resin first, an anhydride hardener first, or all three components can be mixed at once. The phosphine oxides were found to have an accelerating effect upon the cure of epoxy resins such that no additional accelerators are required.

The resin mixtures herein described may be cast into sheets by heating in molds consisting of mylar-lined glass plates with teflon spacers. Fillers may be added to the resin-phosphine oxide mixtures which can then be compression, transfer or injection molded. The epoxy resin mixtures of the present invention can also be used as laminating resins using either dry molding or wet lay-up techniques. The preferred substrate is glass cloth but a woven or non-woven fabric or sheets of cellulose may be substituted for the glass cloth to obtain a laminate having different physical and electrical properties. Such epoxy resins can be used in any application involving epoxy resins but are most suited for electrical applications including laminated printed circuit boards, potting compounds, castings, encapsulations, molding powders, etc. The claimed phosphine oxide-epoxy resin compositions may also be used as coatings, sealants or adhesives, and can be used with or without fillers and other additives.

It is believed the physical and electrical properties of those epoxy resins cured in the presence of phosphine oxide additives are substantially unchanged from those epoxy resins containing no additives. With the proper formulation and curing temperature, such variations, as do exist, may be further minimized.

The phosphine oxides described herein may be used as the sole flame retardant in epoxy resins or may be used in combination with halogen-containing flame retardants. Mixtures of these materials with other previously described phosphorus based epoxy flame retardants could also be used. Especially effective are mixtures containing the phosphine oxide flame retardants in combination with a brominated bisphenol A based resin such as the diglycidyl ether of tetrabromobisphenol A (manufactured by the Shell Chemical Company of Houston, Texas as EPON® 1120). Preferably such resins may be present in amounts ranging from about 1-80 wt. % based upon the weight of the final resin composition. Most preferably, such resins are present in amounts ranging from 25-50 wt. % based upon the same basis.

The following Examples are intended to illustrate some of the more preferred aspects of the present invention and, accordingly, should not be considered as necessarily limiting the scope of the invention. All parts are expressed in parts by weight unless otherwise specified.

EXAMPLES

Definitions

1. "IBHMPO" shall represent isobutyl-bis(hydroxymethyl)phosphine oxide.
2. "TBHMPO" shall represent t-butyl-bis(hydroxymethyl)phosphine oxide.
3. "MHMPO" shall represent methyl-bis(hydroxymethyl)phosphine oxide.
4. "THMPO" shall represent tris(hydroxymethyl)phosphine oxide, which is contained herein for the purposes of comparison.
5. "BHPPO" shall represent sec-butyl-bis(3-hydroxypropyl)phosphine oxide, which is contained herein for the purposes of comparison.
6. "IBHPPO" shall represent isobutyl-bis(3-hydroxypropyl)phosphine oxide, which is contained herein for the purposes of comparison.

7. "ABT" represents the average burn time for a laminate of an epoxy resin and determined by averaging the burn times from UL-94 tests run on five identical samples of a given laminate.
8. "UL-94" represents a rating under the procedure set forth in UL-94 procedure of Underwriters Laboratories, Inc. for evaluating the flammability of vertically aligned plastic materials. The procedure involves the initial contacting of a flame of specified height to a plastic article for 10 seconds. If the burning plastic extinguishes itself within 30 seconds after removal of the flame, the elapsed time is recorded and the test is then repeated. Failure to self-extinguish within to the 30 second period during either the first or second trial is equated to failure of the flame retardant characteristics of the plastic. The performance of the plastic is rated on a scale consisting of the designations "V-0", "V-1" and "V-2". V-0 denotes that neither burn time exceeded 10 seconds. V-1 denotes that neither burn time exceeded 30 seconds.
9. "Tg" shall mean glass transition temperature. It is determined by dynamic mechanical analysis (DMA), and the tangent delta value is reported in degrees centigrade.

PROCEDURE

A resin formulation was prepared using various quantities of EPON ® 828 resin and EPON ® 1120 resin, (both products Shell Chemical Company). EPON 1120 resin is a brominated bisphenol A resin which is said to contain about 20 weight % of bromine. To said resins were added 6 phr of DICY, 0.45 phr of benzyl dimethyl amine accelerator and 50 phr of methyl cellusolve solvent. Also added were the phosphine oxide flame retardant additives set forth in the above Definitions.

Following complete mixing of the above formulation in a glass jar at 50° C. the formulation was coated onto a 9.5"×15.5" piece of glass cloth (produced by the Clark Schwebel Company and marketed under designated 7642/CS700). The coated glass fiber was then heated to 160° C. for about 7 minutes in a forced draft oven. The fiber, now a non-tacky prepreg, was then cut into nine (9) 3"×5" strips which were stacked upon one another (4 up, 5 down) with an aluminum plate coated with releasing fabric on the outer sides thereof. The stack was then placed on a press. The stacked strips were then subjected to elevated temperatures and pressures according to the following general schedule:
10 minutes at 120° C. with no pressure applied.
45 minutes at 200° C. with applied pressure of about 200 psi.

It should be noted that the application of heat and pressure was varied slightly sample to sample in order to control resin flow of the laminate. This was done by varying the time period that the laminate was held at 120° C. without application of pressure.

The press and laminate were then cooled. Upon removal from the press, the laminates appeared light green/translucent in color with varying amounts on resin adhering to the edges thereof. A laminate was then weighed, its thickness measured and its percent resin content determined. The laminate was then cut into five strips (0.5"×5") for use in conducting the previously described UL-94 test. The data gathered in this test is set forth in Table 1.

TABLE 1

| Example | % P | % Br | Additive | % Resin | UL-94 Rating | ABT (sec.) |
|---|---|---|---|---|---|---|
| 1 | 0 | 20 | — | 43 | V-0 | 1.4 |
| 2 | 0 | 18 | — | 41 | V-0 | 0.8 |
| 3 | 0 | 16 | — | 42 | V-0 | 4.3 |
| 4 | 0 | 14 | — | 42 | V-1 | 14 |
| 5 | 0 | 12 | — | 44 | V-1 | 22 |
| 6 | 0 | 10 | — | 42 | fails | — |
| 7 | 1.0 | 9 | IBHMPO | 39 | V-0 | 0.2 |
| 8 | 0.8 | 9 | IBHMPO | 41 | V-0 | 3.9 |
| 9 | 0.5 | 11 | IBHMPO | 42 | V-0 | 1.9 |
| 10 | 0.6 | 10 | IBHMPO | 41 | V-1 | 3.7 |
| 11 | 0.5 | 15 | IBHMPO | 30 | V-0 | 0.4 |
| 12 | 0.5 | 11 | IBHMPO | 25 | V-0 | 0.4 |
| 13 | 0.5 | 9 | IBHMPO | 31 | V-1 | 9 |
| 14 | 0.7 | 13 | IBHMPO | 25 | V-0 | 0 |
| 15 | 0.7 | 9 | IBHMPO | 32 | V-0 | 1.2 |
| 16 | 0.7 | 7 | IBHMPO | 38 | V-1 | 16.2 |
| 17 | 0.8 | 11 | IBHMPO | 36 | V-0 | 1.2 |
| 18 | 0.8 | 7 | IBHMPO | 28 | V-0 | 3.0 |
| 19 | 0.8 | 5 | IBHMPO | 34 | fails | 27.4 |
| 20 | 1.0 | 9 | IBHMPO | 33 | V-0 | 1.0 |
| 21 | 1.0 | 7 | IBHMPO | 28 | V-1 | 10.2 |
| 22 | 1.0 | 5 | IBHMPO | 30 | V-1 | 15 |
| 23 | 0.8 | 8 | TBHMPO | 35 | V-1 | 8.8 |
| 24 | 3.0 | 0 | TBHMPO | 44 | fails | — |
| 25 | 3.0 | 0 | TBHMPO | 46 | V-1 | 22.4 |
| 26 | 0.8 | 10 | TBHMPO | 39 | V-0 | 3.3 |
| 27 | 0.6 | 10 | MHMPO | 37 | V-1 | 7.5 |
| 28 | 1.0 | 10 | MHMPO | 41 | V-0 | 2.1 |
| 29 | 0.6 | 10 | THMPO | 31 | V-0 | 3.4 |
| 30 | 0.6 | 10 | THMPO | 36 | V-0 | 2.4 |
| 31 | 0.8 | 7 | IBHPPO | 43 | fails | 23 |
| 32 | 0.8 | 10 | IBHPPO | 32 | V-1 | 8.0 |
| 33 | 0.8 | 7 | BHPPO | 35 | V-1 | 15.6 |
| 34 | 0.8 | 10 | BHPPO | 36 | V-1 | 6.0 |

The data above demonstrates that the claimed resin compositions exhibit flame retardant properties even when such compositions do not contain bromine therein. However, superior results are achieved wherein bromine is indeed present in such compositions.

The glass transition temperatures of several resins produced in the course of the preceding Examples were determined. The results are set forth in Table 2 below. Tg data for resins not containing flame retardant additives were also determined. Resins containing 10% and 20% bromine possessed Tg's of 143 and 137, respectfully.

TABLE 2

| Example No. | % P | % Br | Additive | Tg |
|---|---|---|---|---|
| 23 | 0.8 | 8 | TBHMPO | 147 |
| 25 | 3.0 | 0 | TBHMPO | 131 |
| 27 | 0.6 | 10 | MHMPO | 145 |
| 29 | 0.6 | 10 | THMPO | 144 |
| 32 | 0.8 | 10 | IBHPPO | 131 |
| 34 | 0.8 | 10 | BHPPO | 133 |
| 11 | 0.5 | 15 | IBHMPO | 142 |
| 10 | 0.6 | 10 | TBHMPO | 141 |
| 26 | 0.8 | 10 | TBHMPO | 141 |
| 28 | 1.0 | 10 | MHMPO | 142 |

The above data shows that the claimed flame retardant resin compositions possess Tg's comparable to those of resin compositions which do not contain flame retardant additives. Moreover, the claimed resin compositions are further shown to possess higher Tg's than those of flame retardant compositions of the prior art. The composition containing THMPO has a similar Tg to the compounds of the invention but is insoluble in the resin varnish and significantly increases the gel time of the resin (Kofler hot bench method).

We claim:

1. An epoxy resin composition having flame retardant properties comprising an epoxy resin, a hardener and an effective amount of at least one dihydroxymethyl phosphine oxide of the formula $$\underset{R-P-(CH_2OH)_2}{\overset{O}{\|}}$$

wherein R represents an alkyl group having from 1 to about 8 carbon atoms or the group R'OH wherein R' represents an alkylene group having from 2 to about 8 carbon atoms.

2. The resin composition of claim 1 wherein R is an alkyl group having from 1 to about 4 carbon atoms and R' is an alkylene group having from 2 to about 4 carbon atoms.

3. The resin composition of claim 1 wherein the dihydroxymethyl phosphine oxide is selected from the group consisting of isobutyl-bis(hydroxymethyl)phosphine oxide, t-butyl-bis(hydroxymethyl)phosphine oxide, methyl-bis(hydroxymethyl) phosphine oxide, and mixtures thereof.

4. The resin composition of claim 1 wherein the dihydroxymethyl phosphine oxide is present in quantities wherein the phosphorus content contributed ranges from 0.01 to 5% by weight based upon the weight of the resin composition.

5. The resin composition of claim 4 wherein the dihydroxymethyl phosphine oxide is present in quantities wherein the phosphorus content contributed ranges from 0.05 to 2% by weight based upon the weight of the resin composition.

6. The resin composition of claim 1 further comprising from about 1.0 to about 30% by weight of bromine based upon the weight of the resin composition.

7. The resin composition of claim 6 further comprising from about 2 to about 11% by weight of bromine based upon the weight of the resin composition.

8. A process for the production of an epoxy resin composition having flame retardant properties comprising reacting an epoxy resin, a hardener and an effective amount of at least one dihydroxymethyl phosphine oxide of the formula $$\underset{R-P-(CH_2OH)_2}{\overset{O}{\|}}$$

wherein R represents an alkyl group having from 1 to about 8 carbon atoms or the group R'OH wherein R' represents an alkylene group having from 2 to about 8 carbon atoms.

9. The process of claim 8 wherein R is an alkyl group having from 1 to about 4 carbon atoms and R' is an alkylene group having from 2 to about 4 carbon atoms.

10. The process of claim 9 wherein the dihydroxymethyl phosphine oxide is selected from the group consisting of isobutyl-bis(hydroxymethyl)phosphine oxide, t-butyl-bis(hydroxymethyl)phosphine oxide, methyl-bis(hydroxymethyl) phosphine oxide, and mixtures thereof.

11. The process of claim 8 wherein the dihydroxymethyl phosphine oxide is present in quantities wherein the phosphorus content contributed ranges from 0.01 to 5% by weight based upon the weight of the resin composition.

12. The process of claim 11 wherein the dihydroxymethyl phosphine oxide is present in quantities wherein the phosphorus content contributed ranges from 0.05 to 2% by weight based upon the weight of the resin composition.

13. The process of claim 8 further comprising from about 1.0 to about 30% by weight of bromine based upon the weight of the resin composition.

14. The process of claim 13 further comprising from about 2 to about 11% by weight of bromine based upon the weight of the resin composition.

15. A product produced through the process of claim 8.

* * * * *